July 25, 1967 A. R. MORRISON 3,332,649
TREE STAND
Filed Oct. 18, 1965
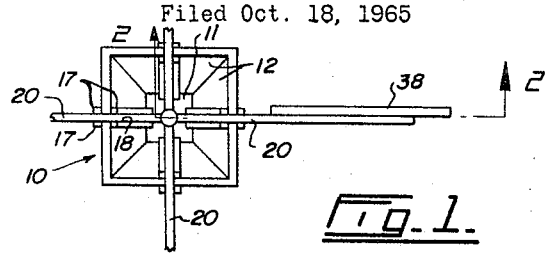
*Fig. 1.*
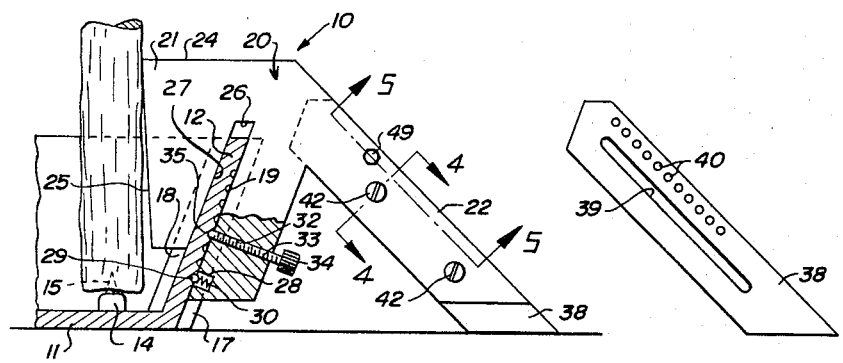
*Fig. 2.* *Fig. 3.*
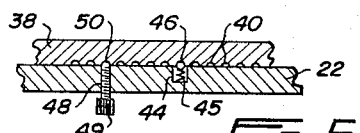 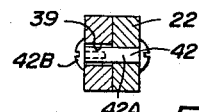
*Fig. 5.* *Fig. 4.*
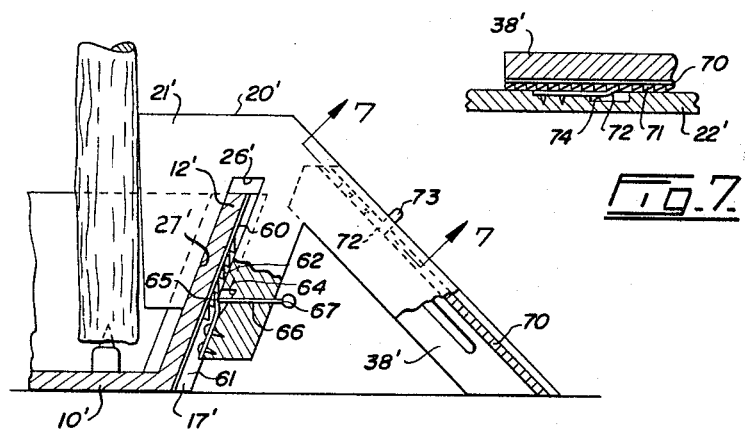
*Fig. 6.* *Fig. 7.*

United States Patent Office 3,332,649
Patented July 25, 1967

3,332,649
TREE STAND
Alexander R. Morrison, 358 E. 63rd Ave., Vancouver,
British Columbia, Canada
Filed Oct. 18, 1965, Ser. No. 497,331
8 Claims. (Cl. 248—47)

This invention relates to a tree stand, particularly adapted for, but not restricted to, use with a Christmas tree.

Christmas trees are commonly erected using home made stands, a new stand generally being made each year. Commercially made stands are available which hold the erected tree securely, and many such stands may be reused. It is known to provide a reusable stand which can be folded for storage, and while such constructions may be satisfactory functionally, when they are made sufficently robust they become expensive and, moreover, often require the use of tools for proper erection. Conditions of low humidity are to be expected at that time of the year in most parts of the country, thus a Christmas tree tends to dry out resulting in debris and in fire hazard. This is inherent in both home made stands and commercially available stands as above.

I have found that these difficulties and disadvantages are reduced by providing a stand which may be assembled, secured to the tree trunk, removed and dismantled for storage, without the use of tools, and which provides a base container adapted to receive the butt of the tree trunk, which container can be filled with water whereby the tree is kept moist.

In the present invention the foregoing is attained by providing stand structure including, a base container having a sidewall inwardly slopping to the bottom thereof, at least three outwardly and downwardly diverging legs, at least one said leg having an inner edge slightly inclined to the vertical defining, with a wall of a sloping slot of the leg, a wedge for cooperative engagement with the sidewall and the trunk of a tree placed upright within the container, and means to secure the butt end of the tree in relation to the container. The foregoing is constructed and arranged so that the slightly inclined inner edge of the slotted leg is urged inwards by a sliding and wedging action as the leg is forced downwards of the sidewall, so urging the trunk of a tree placed centrally within the container against a member, or members, of the sidewall securing the tree in an upright position within the container. External ends of the outwardly diverging legs rest upon the floor. Means are provided to adjust the length of a downwardly diverging leg portion so that, when securing engagement is attained, the ends of the legs may be in contact with the floor thus holding the tree in a substantially vertical position. Means are also provided to secure a leg to the sidewall when the required engagement of the inner edge thereof to the tree trunk has been effected, so that accidental movement or loosening is prevented. As before stated, the base container is adapted to be filled with water.

The foregoing structure, and objects and advantages thereof, will be understood from the following description of a particular embodiment of the invention, and of examples of alternative constructions.

In the drawings:

FIGURE 1 is a partly fragmented plan view of the invention,

FIGURE 2 is a enlarged fragmentary section on line 2—2 of FIGURE 1,

FIGURE 3 is an elevation of a leg extension,

FIGURE 4 is a detail section on line 4—4 of FIGURE 2,

FIGURE 5 is a detail section on line 5—5 of FIGURE 2,

FIGURE 6 is a section similar to FIGURE 2 showing an alternative construction,

FIGURE 7 is a detail section on line 7—7 of FIGURE 6.

Referring to FIGURES 1 and 2, the stand has a base container indicated generally by the numeral 10, which container is in the form of a frustum of an inverted four sided pyramid. The container has a square bottom wall 11, and sidewalls 12 tapering inwardly towards the base. The angle of the sloping walls 12 can be approximately 20° off the vertical.

An integral boss 14 is formed on the bottom wall 11 of the base container. This centrally disposed boss desirably is provided with an upstanding spike 15.

Each of the sloping sidewalls 12 has ribs 17 defining centrally disposed channels 18 which are rectangular in cross section. Between the ribs forming each outer channel 18, the associated wall 12 has a row of semi-spherical indents 19 closely and uniformly spaced from one another.

The four-sided base container is supported by an equal number of legs, each generally indicated by the numeral 20. The legs are cut, preferably from flat light-weight material, to provide an inner portion 21 and an outer portion 22. As shown best in FIGURE 2, the inner portion has an upper edge 24 and an inwardly inclined nearly vertical edge 25 as shown. A deep inclined slot 26 having an inner edge 27 is formed in the portion 21 of the leg, the slot extending upwardly from a lower-inner corner of said portion 21. The inclination of the said slot is such that, when one of said legs is lodged in a slot with the leg portion 21 being received in the channels 18, the edge 25 is inwardly inclined as shown. The ribs 17 closely fit the sides of the portion 21 and prevent the leg from rotating about the longitudinal axis of the slot 26. It is seen that a wedge is defined by the substantially vertical edge 25 and the inner slot edge 27.

Near the lower corner of the portion 21, a recess 28 is drilled in the outer edge of the groove 26. This recess is fitted with a ball 29, and a spring 30 urging said ball outwardly so that part of its projects from the recess. As the leg is fitted to or removed from the container, the ball 29 engages an indent of the row of indents 19, so as to offer a resistance to movement of the leg relative to the sidewall.

Above the recess 28 the portion 21 is drilled and tapped as seen at 32 to receive a locking bolt 33. The bolt 33 has a knurled head 34, and an inner end 35 which is suitably rounded to seat in a semi-spherical indent of the row 19. By advancing the bolt 33 into engagement with an indent, the leg 20 can be secured in selected position on the wall 12. The distance of the bolt 33 from the recess 28 is such that when the ball 29 engages a said indent, the rounded end 35 is in register with one indent of the said row 19.

Fitted to each leg 20 is an extension 38, preferably of the same width and thickness as said leg. As best seen in FIGURE 3, the extension has a longitudinally extending slot 39 and a leg-contacting face of said extension is provided with a row of indents 40. Along the centre of the leg are two spaced apart pins 42, see FIGURE 2. A pin is shown in detail in FIGURE 4, each pin consists of a sleeve 42A and a screw 42B threadedly engaging said sleeve. The pins 42 project freely through the slot 39 slidably connecting the leg and the extension in face-to-face contact. The extension is assembled to the leg in manufacture.

The extension contacting face of the leg also has a recess 44, see FIGURE 5, in which a spring 45 and a ball 46 are mounted. The ball 46 resiliently engages the indents 40 to resist endwise movement of the extension 38 on its leg. The portion 22 of the leg carries a bolt 48 having a knurled head 49 and a rounded end 50 for engagement with one of the indents 40 aforesaid thus to secure the extension 38 to the leg portion 22. It is seen that this arrangement permits the leg to be extended at will to any position at which a ball 46 engages a socket and that, the desired extension having been attained, the extension is secured by hand tightening the bolt 48.

To erect the dismantled parts as a holder for a Christmas tree, the tree is placed upright in the container 10 supported by one hand. As this is done, the spike 15 enters the butt end of the trunk, which end is then supported a short distance above the wall 11 by the boss 14. One of the legs 20 is then fitted to the base container and is pushed downwardly whereupon the inclined wall 12, moving into the sloping slot 26, causes the edge 25 to travel inwardly into contact with the trunk. The opposite leg is fitted in the same way and the other two legs are similarly attached to the container 10 until all four edges 25 engage the trunk.

With the tree still supported by one hand, downward pressure is applied successively to opposing leg pairs. This movement serves to wedge the tree trunk between the edges 25 so that thereafter it is firmly supported.

When one leg is being forced downward wedging action takes place as has been explained. It is clear that the tree trunk is urged against the inclined edges of the remaining legs, and that, because of the inherent properties of a wedge, the said edges will not be moved by pressure of the trunk against them—they are effectively members secured to the sidewall.

As each leg is forced downwardly on its side wall, the ball 29 traverses the row of indents 19 and finally seats in one of said indents. When the downward pressure is removed this seating of the ball in an indent resists force which might otherwise tend to urge the leg upwardly. When all the legs are adjusted in this manner the bolts 32 are tightened by hand positively locking each leg to the base container.

The position of the legs relative to the floor will vary according to the diameter and shape of the tree trunk. To compensate for this unevenness of the legs the extensions are adjusted, in the manner described above, so that their lower ends are in firm contact with the floor. When the bolt 49 is tightened into an indent 40, the two leg parts are firmly locked together. When erection is thus completed, the base container is filled with water.

Thus, it will be seen that the entire stand and tree erecting operation may be performed without the use of tools. The stand is readily dismantled from the tree by performing these operations in a reverse sequence. It is seen that the legs may be stacked, and if desired placed within the base container, to make a compact package for storage.

FIGURES 6 and 7 show an alternative construction utilizing ratchet means in lieu of the above described ball and indent means, referring to these figures, the base container 10' has side walls 12' which are fitted with metal ratchet strips 60. These strips are embedded and suitably secured within grooves 61 formed in the outer surface of the sidewalls 12' between the ribs 17'. As shown in FIGURE 6, the ratchet strips have triangular-shaped teeth 62 tips of which are flush with the outer surface of the sidewall, the lowermost edges of the said teeth being perpendicular to the said wall surface.

Each leg 20' supporting the modified container is slotted as at 26' as in the FIGURE 2 embodiment, and the outer edge of this slot is provided with a recess 64. Secured within this recess is a pawl 65 formed by a short length of leaf spring which normally is in resilient engagement with a tooth of the ratchet 60. The inner portion 21' of the leg has an opening 66 in which a release rod 67 is slidably mounted. One end of the rod 67 is suitably secured to the pawl 65 so that said pawl may be pulled out of engagement with the ratchet teeth when desired. Thus, it will be seen that the leg 20' may be pushed downwardly on the base container with pawl 65 riding over the ratchet teeth 62. Upward movement by the leg cannot take place until the pawl is disengaged from the teeth by means of the release rod 67.

The leg 20' carries an extension 38' which is also fitted with a ratchet strip 70, the teeth 71 of which are disposed as previously described. This ratchet strip is engaged by a pawl 72 which is secured to the adjoining face of the portion 22' of the leg. A leaf spring forming the pawl 72 is L-shaped, and a free end 73 thereof projects a short distance beyond the upper edges of the leg and its extension. As shown in FIG. 7, the extension contacting face of the portion 22' has a recess 74 into which the end 73 of the pawl may be moved to disengage the pawl from the ratchet 70. The extension will thus move freely in a downward direction but is locked against movement in the opposite direction until the pawl 72 is released manually.

The several parts making up the modified dispenser are assembled in tree supporting position in much the same manner as previously described. The legs 20' and their extensions 36' are locked automatically in adjusted position by their pawl and ratchet mechanisms and there is no need for additional locking means.

It is to be understood that the embodiments given above are by way of example and that the invention is not limited thereto.

As seen in FIGURE 2, the 20° taper of the sidewalls is not critical within about 5°, that is the taper may be from about 15° to about 25°. The amount by which the edge 25 deviates from the vertical is not critical, the edge slopes inwards the top as shown in FIGURE 2 so that a long moment arm, as measured from the spike 15 to the junction of the edges 24 and 25, is obtained. Inclination greater than the taper of the tree is desirable, a few degrees off the vertical will suffice to attain the result above. I use the term, "inwardly inclined nearly vertical edge," herein with reference to structure essentially as above described. Alternatively to the spike 15, equivalent means may be used to restrain the butt end of the tree, for instance a taper socket. Or the restraining means may be provided by configuration wherein the interior of the inverted pyramid is sufficiently reduced in size adjacent bottom edges thereof as to provide a such restraint so to be within the invention.

As well, an embodiment having three legs as described associated with a suitable base container may obviously be used. Further, two legs may be permanently secured to the base container with their substantially vertical edges spaced so as to receive the butt of a Christmas tree of an average size, the third leg being movable of the base container sidewall for wedging the butt into supporting and clamping engagement with the fixed leg members, secured to the sidewall. This arrangement will accept a limited range of butt sizes deviating from the chosen average by amounts not greater than permitted by the range of motion of the wedge structure.

Alternatively to the fixed legs having substantially vertical edges providing, in effect, an open socket for the butt to be wedged against, alternate socket like structure, for example a member secured to the sidewall and adapted to receive a part of the circumference of the butt, is equivalent. The fixed legs being of equal length, it is necessary that only the movable leg have an adjustably extending portion in order to plumb the secured tree.

Similarly, in an embodiment having four legs, three may be fixed.

A four sided, or three sided as the case might be, truncated pyramid is not essential. Conical or ornamental shape, or polygonal pyramid frusta, may obviously be substituted for the particular base container described and illustrated.

I prefer the four legged square truncated pyramid structure above described, with each leg movable and adjustable as to length, as being able to accommodate a greater range of butt sizes and, generally, as being of desirably adequate stability.

I claim:
1. A stand of the type described comprising in combination,
   (a) a base container having a sidewall tapering inwardly from the top of the container to the bottom thereof,
   (b) at least three outwardly and downwardly diverging legs supporting said base container in an upright position upon a floor,
     (i) each of said legs having an inwardly inclined nearly vertical inner edge of a top portion thereof defining, with a sidewall of a sloping slot of the top portion, a wedge,
constructed and arranged so that, the sidewall being received in the slot, downward movement urges the inwardly inclined nearly vertical edge against the trunk of a tree standing in an upright position within the container supporting and clamping the trunk against a member secured to the sidewall,
   (c) means to secure the butt of the tree centrally in the container,
   (d) and an extension adjustably secured to each outwardly and downwardly diverging leg portion aforesaid,
constructed and arranged so that an end of the extension can be placed in contact with the floor when the tree, clamped and secured as aforesaid, is in a vertical position.

2. Structure as defined in claim 1, having means yieldably resisting the movement of the leg relative to the sidewall and means yieldably resisting movement of the extension relative to the leg, and having means to lock the leg to the sidewall and means to lock the extension to the leg.

3. Structure as defined in claim 2, the container sidewall having ribs defining a channel to receive edges of the slot, and having spike means to secure the butt of the tree.

4. Structure as defined in claim 3 having a yieldable resisting means which includes indents in the container wall and a spring urged ball in the leg engaging a cooperating indent.

5. Structure as defined in claim 4 in which the container has four sidewalls each tapering inwardly to the bottom of the container at an angle of from 15° to 25° to the vertical, and in which a leg is associated with each sidewall.

6. Structure as defined in claim 3, having a yieldably resisting means which includes a pawl cooperating with a ratchet, and means to disengage the pawl from the ratchet.

7. Structure as defined in claim 6, in which the container has four sidewalls each tapering inwardly to the bottom of the container at an angle of from about 15° to about 25° to the vertical, and in which a leg is associated with each sidewall.

8. Structure as defined in claim 1, further characterized by the container being watertight and having an inward taper of the sidewall between about 15° and about 25°, and wherein the butt securing means includes a spike secured centrally in the container close to the bottom thereof, and adapted for engagement with the butt aforesaid.

References Cited
UNITED STATES PATENTS

| | | | |
|---|---|---|---|
| 1,172,734 | 2/1916 | Raymond | 248—44 |
| 1,750,367 | 3/1930 | Smith | 248—44 |
| 2,455,025 | 11/1948 | Schroeder | 248—47 |
| 2,679,994 | 6/1954 | Mellen | 248—47 |
| 2,727,708 | 12/1955 | Lorenzen | 248—47 |

JOHN PETO, *Examiner.*

CHANCELLOR E. HARRIS, *Primary Examiner.*